US007614955B2

(12) United States Patent
Farnham et al.

(10) Patent No.: US 7,614,955 B2
(45) Date of Patent: Nov. 10, 2009

(54) METHOD FOR ONLINE GAME MATCHMAKING USING PLAY STYLE INFORMATION

(75) Inventors: Shelly D. Farnham, Seattle, WA (US); Bruce Christopher Phillips, Seattle, WA (US); Scott Lee Tiernan, Seattle, WA (US); Keith Steury, Seattle, WA (US); William B. Fulton, Seattle, WA (US); Jens Riegelsberger, Achem (DE)

(73) Assignee: Microsoft Corporation, Redmond, WA (US)

( * ) Notice: Subject to any disclaimer, the term of this patent is extended or adjusted under 35 U.S.C. 154(b) by 557 days.

(21) Appl. No.: 10/788,408

(22) Filed: Mar. 1, 2004

(65) Prior Publication Data

US 2005/0192097 A1      Sep. 1, 2005

(51) Int. Cl.
*A63F 9/24* (2006.01)
*A63F 13/00* (2006.01)
*G06F 17/00* (2006.01)
*G06F 19/00* (2006.01)

(52) U.S. Cl. .............................. 463/42; 463/29; 463/40
(58) Field of Classification Search .................. 463/42, 463/29, 40
See application file for complete search history.

(56) References Cited

U.S. PATENT DOCUMENTS

| | | | |
|---|---|---|---|
| 5,600,829 A * | 2/1997 | Tsatalos et al. ................ 707/2 |
| 5,894,556 A | 4/1999 | Grimm et al. | |
| 5,914,714 A | 6/1999 | Brown | |
| 6,023,729 A | 2/2000 | Samuel et al. | |
| 6,128,660 A * | 10/2000 | Grimm et al. ............... 709/227 |
| 6,134,590 A * | 10/2000 | Perlman ...................... 709/228 |
| 6,203,433 B1 * | 3/2001 | Kume .......................... 463/42 |
| 6,216,112 B1 * | 4/2001 | Fuller et al. ................... 705/14 |
| 6,322,451 B1 | 11/2001 | Miura | |
| 6,345,297 B1 * | 2/2002 | Grimm et al. ............... 709/227 |

(Continued)

FOREIGN PATENT DOCUMENTS

EP        1122664 A2 *  8/2001

(Continued)

OTHER PUBLICATIONS

Kathman, R., "Data Collection In Field Combat Simulation," Proceedings of the 17th Conference on Winter Simulation, D. Gantz, G. Blais, S. Solomon (eds.), Dec. 1985, pp. 376 to 380.

(Continued)

*Primary Examiner*—John M Hotaling, II
*Assistant Examiner*—Adetokunbo Torimiro
(74) *Attorney, Agent, or Firm*—Woodcock Washburn LLP

(57) ABSTRACT

A method and system for accumulating data to match and matching a user, based upon a play style and/or personal attribute, in an online gaming environment is described. One aspect of the invention provides a matchmaking system that matches players based upon a play style of the players. The system matches players who are looking for games with players who prefer similar play styles. Similarly the system can match players based upon a personal attribute of the player. The system can be built into existing general skill level and technical capabilities based matchmaking systems to provide more user desired matchmaking parameters, allowing a user to choose based upon play style, personal attribute, general skill level, and/or technical capabilities.

36 Claims, 10 Drawing Sheets

U.S. PATENT DOCUMENTS

| | | | |
|---|---|---|---|
| 6,352,479 B1 * | 3/2002 | Sparks, II | 463/42 |
| 6,480,885 B1 * | 11/2002 | Olivier | 709/207 |
| 2001/0034766 A1 * | 10/2001 | Morimoto | 709/205 |
| 2002/0002468 A1 * | 1/2002 | Spagna et al. | 705/1 |
| 2002/0077178 A1 * | 6/2002 | Oberberger et al. | 463/42 |
| 2002/0083179 A1 * | 6/2002 | Shaw et al. | 709/227 |
| 2002/0105144 A1 * | 8/2002 | Tait et al. | 273/292 |
| 2002/0107726 A1 * | 8/2002 | Torrance et al. | 705/12 |
| 2002/0115488 A1 | 8/2002 | Barry et al. | |
| 2002/0116615 A1 * | 8/2002 | Nguyen et al. | 713/168 |
| 2002/0142825 A1 * | 10/2002 | Lark et al. | 463/16 |
| 2002/0143652 A1 * | 10/2002 | Beckett | 705/26 |
| 2002/0165792 A1 * | 11/2002 | Morrell, Jr. | 705/26 |
| 2003/0216962 A1 * | 11/2003 | Heller et al. | 705/14 |
| 2003/0220143 A1 * | 11/2003 | Shteyn et al. | 463/42 |
| 2003/0228895 A1 * | 12/2003 | Edelson | 463/1 |
| 2005/0171955 A1 * | 8/2005 | Hull et al. | 707/10 |
| 2005/0181347 A1 * | 8/2005 | Barnes et al. | 434/350 |

FOREIGN PATENT DOCUMENTS

| | | | |
|---|---|---|---|
| EP | 1146458 A2 | | 10/2001 |
| GB | 2388493 A | * | 11/2003 |

OTHER PUBLICATIONS

Pennock, David M., Nielsen, Finn Arup, and Giles, C. Lee, "Extracting Collective Probabilistic Forecasts from Web Games," Proceedings of the Seventh ACM SIGKDD International Conference on Knowledge Discovery and Data Mining, Aug. 2001, pp. 174 to 183.

Saha, Debanjan, Sahu, Sambit, and Shaikh, Anees, "A Service Platform for On-Line Games," Proceedings of the $2^{nd}$ Workshop on Network and System Support for Games, May 2003, pp. 180 to 184.

* cited by examiner

MULTIPLAYER GAME MATCHMAKING SERVICE

PLEASE ANSWER THE FOLLOWING:

1) I WISH TO
   - ○ HOST A GAME
   - ● JOIN A GAME   — 615

2) I WANT TO PLAY
   - ○ BASEBALL 3000
   - ● FOOTBALL EXTREME   — 625

3) I PLAY THIS GAME
   - ○ MORE AGGRESSIVE
   - ● LESS AGGRESSIVE   — 635

[OTHER PARAMETERS?] — 690

MULTIPLAYER GAME MATCHMAKING SERVICE

OPEN GAMES WITH MATCHING PARAMETERS:

- ● MIKE'S BEARS VS. PACKERS FOREVER GAME   — 660
- ○ JIM'S NO HOLDS BARRED GAME
- ○ BOB'S TAUNT IT IF YOU CAN GAME
- ○ DAVE'S '72 DOLPHINS GAME

[OTHER PARAMETERS?] — 695

MULTIPLAYER GAME MATCHMAKING SERVICE

PLEASE ANSWER ANY OF THE FOLLOWING:

I WANT TO PLAY BASED ON:

- ○ INCOME
- ○ EDUCATIONAL BACKGROUND
- ○ AGE
- ● PHYSICAL APPEARANCE (715)
- ○ HOME STATE
- ○ LIKEABILITY
- ○ HONESTY
- ○ TRASH TALKING

[STILL OTHER PARAMETERS?] (790)

MULTIPLAYER GAME MATCHMAKING SERVICE

PLEASE CHOOSE FROM THE FOLLOWING:

I WANT TO PLAY:

○ [person] ○ [person]

○ [person] ● [person] (765)

[STILL OTHER PARAMETERS?] (795)

(705)

MULTIPLAYER GAME MATCHMAKING SERVICE

POST GAME ANALYSIS
PLEASE ANSWER THE FOLLOWING:

1) I ENJOYED THE GAME
    ○ YES    815 ──● NO

2) I ENJOYED PLAYING WITH THESE PEOPLE
825 ──● YES    ○ NO

3) MY FAVORITE PLAYER WAS
835 ──● BOB  ○ MIKE  ○ JIM

4) MY LEAST FAVORITE PLAYER WAS
○ BOB  ● MIKE  ○ JIM

[OTHER QUESTIONS? — 890]

MULTIPLAYER GAME MATCHMAKING SERVICE

POST GAME ANALYSIS
PLEASE ANSWER THE FOLLOWING:

1) FOOTBALL EXTREME WAS (CHOOSE ALL THAT APPLY)
● TOO VIOLENT — 865  ○ TOO EASY  ● TOO DIFFICULT — 867

2) BOB WAS
○ FRIENDLY AND GOOD  ● FRIENDLY, BUT NOT VERY GOOD — 875  ○ GOOD, BUT NOT VERY FREINDLY

3) MIKE WAS
○ NOT FRIENDLY AND NOT GOOD  ○ FRIENDLY, BUT NOT VERY GOOD  ● GOOD, BUT NOT VERY FREINDLY — 885

[OTHER QUESTIONS? — 895]

METHOD FOR ONLINE GAME MATCHMAKING USING PLAY STYLE INFORMATION

FIELD OF THE INVENTION

Aspects of the present invention are directed generally to methods and systems for matching users in an online gaming environment. More particularly, aspects of the present invention are directed to methods and systems for matching suitable users in an interactive online environment by matching users based upon parameters of a user.

BACKGROUND OF THE INVENTION

Originally, online gaming has been the purview of more technologically experienced users who could deal with the difficulty of properly configuring their computer for online gaming play. Because of the complexity of technical skill required to allow for online gaming competition, initial users generally were more hard-core players who enjoyed the competitiveness of multiplayer gaming. Consequently, developers of games and gaming services historically have built online matchmaking services for gaming environments that are only based on one of two criteria, technical criteria (such as the connection speed of the computer in use, operational speed of the computer in use, or the language preference of a user) or the general skill level of the user.

Today, online gaming has become a form of entertainment for millions of people. A new generation of user friendly gaming systems allows a large number of new and less experienced users to connect online and interact with others. Two such systems include XBOX Live® by Microsoft Corporation® of Redmond, Wash. and the EA Sports™ online service by Electronic Arts™ Inc. of Redwood City, Calif. In particular, XBOX Live® allows users to interact with each other beyond mere game play. For example, a user can talk to another user during the game, such as to "trash talk", e.g., taunt, the other player or to constructively collaborate with another player to make a plan or strategy. Such advances have helped to increase the number of online players by including more human interaction in the process. The growing population of users is more diverse compared to earlier generations of users. As a result of the increase in users of all different abilities, users are introduced to a wide variety of different opponents and online experiences. Still, gaming systems and services today match users based on technical criteria and/or general skill level criteria only.

Conventional gaming systems and services allow a user to be matched with others based upon skill level. Skill level can be defined by many different and unique criteria, such as number of wins or number of losses. Such criteria help a novice player that is unfamiliar with many of the different facets of a particular game and/or game type to be matched with other novice players similarly unfamiliar. Additionally, highly skilled players can be matched with similarly highly skilled players immediately, thereby conveniently and quickly allowing a hard-core player to compete against other hard-core players. However, when a user, whether novice or highly skilled, is matched with a similar competitor for a game, the user has no idea as to whether the competitor is a person that talks trash, that is a male, that is a grandmother, that lives in Newark, N.J., or that has a similar educational background that the user has. A user may want to be matched with another player with a similar background, such as one of these criteria.

Generally, when a user desires to be matched with another competitor for a particular game and/or game type, the user must select a "Room" (or "Lobby") with the goal of beginning a new session instance, such as a game. Once in a Room, the user must decide to create a new session instance, or find a session instance that is already created, but is not full. The user then waits until the selected session instance has enough players present to begin. Under the conventional matchmaking model, novice players can choose to be matched with similarly skilled opponents, but the novice player cannot choose to be matched with similar novice players from a certain geographic region, from a similar economic background, based upon a preferred hobby, or based upon the physical appearance of another player.

One aspect of online gaming services and systems which is not recognized widely in the art is the fact that many players are utilizing online game matchmaking services primarily for social rather than competitive reasons. Because conventional gaming systems match based upon only technical or general skill level criteria, existing matchmaking systems do not fully support what today's multiplayer gamer desires. Players with different interests, styles, and/or personalities often find themselves playing with, or against, one another as existing matchmaking systems do not take a play style of a player into consideration when matching players into online games. These mismatches result in many players experiencing what the player may feel is inappropriate behavior by the other player. These experiences result in negative online experiences for some consumers and can result in players quitting a game or the gaming experience all together.

SUMMARY OF THE INVENTION

Therefore, what are needed are systems and methods to accumulate necessary data for matching and to match users in real-time over a computer network, such as the Internet, based upon a play style and/or personal attribute of a user. Such systems should be able to be built into existing skill-based and/or technical criteria based matchmaking systems to provide the best matches for different players. One aspect of the invention provides a matchmaking system that matches players based upon a play style of the players. According to one aspect of the invention, the system matches players who are looking for games and/or game types with players who prefer similar play styles. In a specific example, a play style may include the aggressiveness or competitiveness a player has for a particular game and/or in general. Similarly the system can match players based upon what a player may consider to be appropriate online behavior. For example, a player can choose to refrain from competing against other players that "trash talk" and/or indicate that they use profanity during game play. Such a system can be built into existing general skill level and technical capabilities based matchmaking systems to provide more user desired matchmaking parameters, allowing a user to choose based upon play style, general skill level, and/or technical capabilities.

Another aspect of the invention allows for implicit play style and/or personal attribute matchmaking or explicit play style and/or personal attribute matchmaking. Still another aspect of the invention provides a system and method for accumulating the necessary data to match players based upon a player's play style. Such a system and method can include collaborative filtering methods to more accurately match players with desired opponents and/or teammates.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIGS. 6A and 6B are example graphical user interfaces for matching players in an online gaming environment in accordance with at least one aspect of the present invention;

FIGS. 7A and 7B are example graphical user interfaces for matching players in an online gaming environment in accordance with at least one aspect of the present invention;

FIGS. 8A and 8B are example graphical user interfaces for accumulating data from players in an online gaming environment in accordance with at least one aspect of the present invention.

DETAILED DESCRIPTION OF ILLUSTRATIVE EMBODIMENTS

In the following description of various illustrative embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Terms

Game category—a division within a system of classification of games including multiple game types. A game category includes sports-based games, football-based games, first person shooter-based games.

Game type—a particular manufacturer's game. A game type includes Halo™ by Microsoft® Corporation of Redmond, Wash., Unreal® Championship by Epic Games, Inc. of Raleigh, N.C., and SEGA GT 2002™ by SEGA of America, Inc. of San Francisco, Calif.

Game—a particular game in which to participate. A game includes a four player Halo™ game hosted by Robert Jenkins in which the objective is capture the flag.

Parameter—an identifier that can be utilized by a matchmaking system to match a user to a game category, game type, and/or a user. Parameters include play style parameters, personal attribute parameters, general skill level parameters, and technical capability parameters.

Play style parameter—an identifier representative of a style of play of a user. A play style parameter may be specific to a particular game category, game type, game, and/or it may be general to the player. Play style parameters include a competitiveness parameter, an honesty/trustworthy parameter, an aggressiveness parameter, a trash talking parameter, and a profanity parameter.

Personal attribute parameter—an identifier representative of an attribute of a player's life. Personal attribute parameters include income, age, gender, characteristics of physical appearance (eye color, body type, hair color), occupation, and educational background.

General skill level parameter—an identifier representative of the expertise of a player for a game category, game type, and/or game. General skill levels include novice, advanced, expert, and win/lose ratio.

Technical capability parameter—an identifier representative of the technical characteristics of the electronic equipment associated with the player. Technical capability parameters include network connection speed and operation speed of the player's computer.

General Computing Platforms

Figure 1:
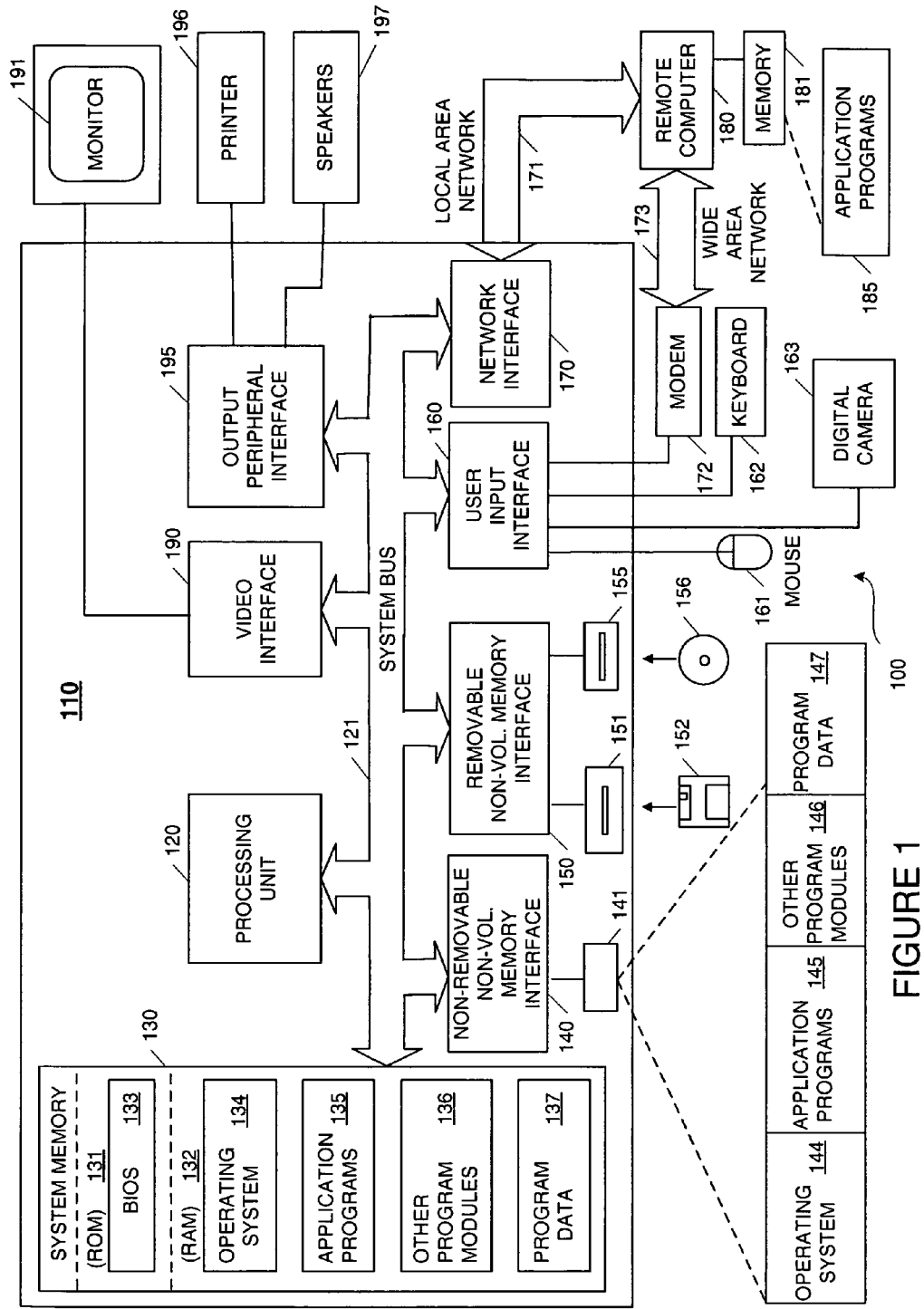
FIG. 1 illustrates a schematic diagram of a general-purpose digital computing environment in which certain aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency or requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although not required, many embodiments are described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that various aspects may be practiced with other computer system configurations, including hand-held devices, multiprocessor systems, microprocessor-based or programmable consumer electronics, game consoles, network PCs, minicomputers, mainframe computers, and the like. In accordance with at least one aspect of the present invention, in distributed computing environments tasks may be performed by remote processing devices that are linked through a communications network. In a distributed computing environment, program modules may be located in both local and remote memory storage devices.

Matchmaking Process

Figure 2A:
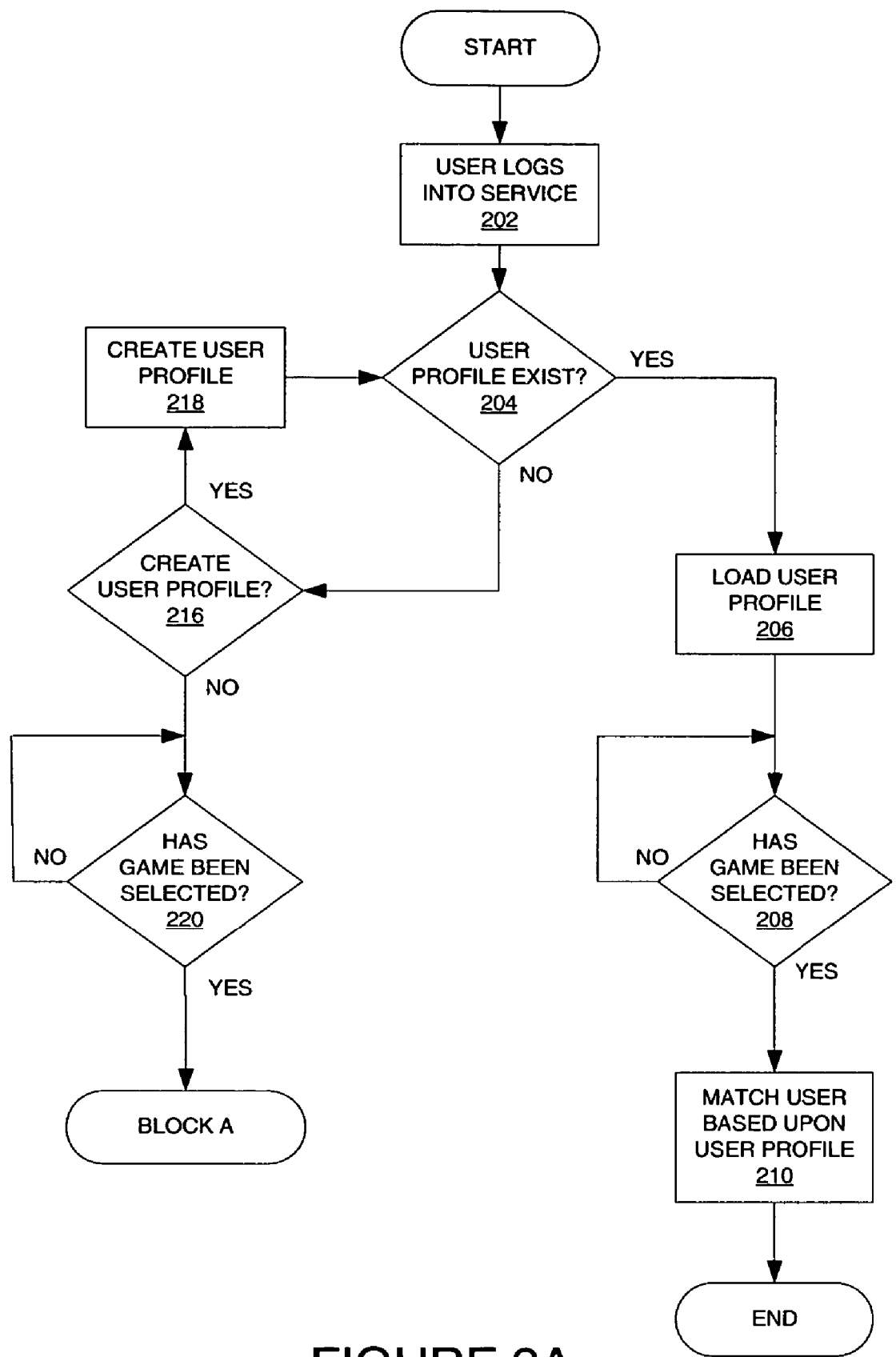
FIGS. 2A and 2B show a flow chart of an illustrative method for matching users to other users in an online gaming environment in accordance with one aspect of the present invention.
Figure 2B:
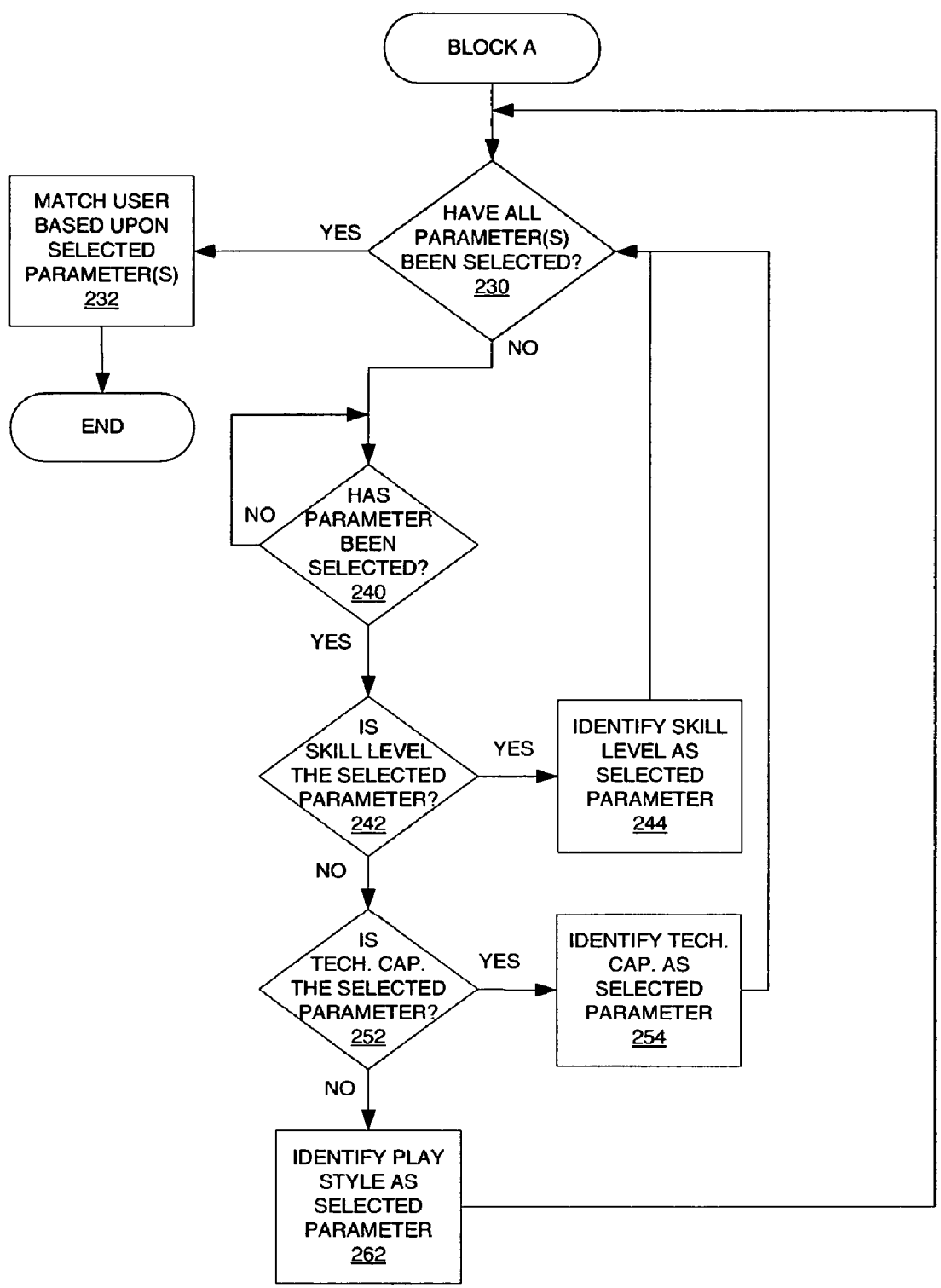

FIGS. 2A and 2B show a flow chart of an illustrative method for matching users to other users in an online gaming environment in accordance with one aspect of the present invention. The exemplary method begins in FIG. 2A when a user/player logs into a matchmaking service provider for an online gaming experience at step 202. There are a number of different ways in which a user may connect to an online service for matching purposes, including dialing into the service via a modem and telephone line and/or connecting via a high speed Ethernet connection. Also, there are a number of different ways in which a user may log into such a service. For example, the matchmaking service may require the user to enter a valid name or identification and associated password. The user may be required to have a valid account with the matchmaking service provider. Once a user has logged into the matchmaking service, at step 204, a determination is made as to whether a profile exists for the user.

A profile for a user can be any type of a number of different parameters associated with the user. For example, the profile may contain technical capabilities of the user (such as computer speed and connection speed), general skill level information of the user (such as novice in one game while expert in another), play style information of the user (such as competitiveness, aggressiveness, profanity), and/or personal attributes of the player (such as age, income, educational background, occupation, home state). Further examples of play style information and personal attributes are described below. In response to determination step 204, if a profile is found to exist for the user, the profile is loaded at step 206. A determination is made as to whether a game category, game type, and/or game has been selected by the user and/or whether the system has automatically selected a game category, game type, and/or game at step 208 and, if so, the user is matched to other users/players to play a game of the game category, a game of the game type, or the game based at least in part upon the profile of the user at step 210. It should be understood by those skilled in the art that other classifications may be utilized within the matchmaking process and that the present invention is not limited to game categories, game types, and games as defined herein. Any classification could have a sub-classification. For example, a game category may be sports-based games, while a sub game category may include football based games and baseball based games. Further, an additional sub category under the football based sub category may include professional team based games, collegiate team based games, and street based games. Further, sub game types may include different versions of the same manufactured game, such as "FOOTBALL EXTREME" and "FOOTBALL EXTREME SPECIAL EDITION". Any number of different classification systems may be utilized in accordance with the present invention.

If a profile is found not to exist for a user at step 204, a further determination is made as to whether the user wishes a new profile to be created for the user at step 216. Such a determination may be an inquiry by the matchmaking service to the user and receiving a response from the user acknowledging the desire of the user to have a profile created. If there is a request to create a user profile, the process proceeds to step 218 where a user profile is created. With the user profile created in step 218, the process returns to step 204. However, if the user does not want a profile created at step 216, at step 220, a determination is made as to whether a game category, game type, and/or game has been selected by the user. If a game category, game type, and/or game has been selected at step 220, the process continues to step 230 in FIG. 2B.

At step 230, a determination is made as to whether all parameter(s) have been selected by the user and/or whether all parameter(s) required by the system have been selected. If all parameter(s) have been selected, the process proceeds to step 232 where the user is matched to other users/players to play a game based at least in part upon the selected parameter (s). If all parameter(s) have not been selected at step 230, the process proceeds to step 240 where a determination is made as to whether a parameter has been selected. If a parameter has been selected at step 240, the process proceeds to step 242 where a determination is made as to whether the selected parameter is a skill level parameter of the user. If the answer is yes, the method identifies the skill level as the selected parameter at step 244 and then the process returns to step 230. If skill level is not the selected parameter in step 240, the process proceeds to step 252 where a determination is made as to whether the selected parameter is a technical capability of the user's computer and/or connection speed. If the answer is yes, the method identifies the technical capability as the selected parameter in step 254 and them the process returns to step 230. If technical capability is not the selected parameter at step 252, the process proceeds to step 262 where the method identifies play style as the selected parameter and the process returns to step 230. Under such a system, a user/player can be matched in a game with other users/players based upon conventional parameters such as general skill level and technical capabilities as well as play style information associated with and/or chosen by the user/player. Although not shown in this example, a user may be connected by personal attribute parameters in the alternative or as well.

Figure 3:
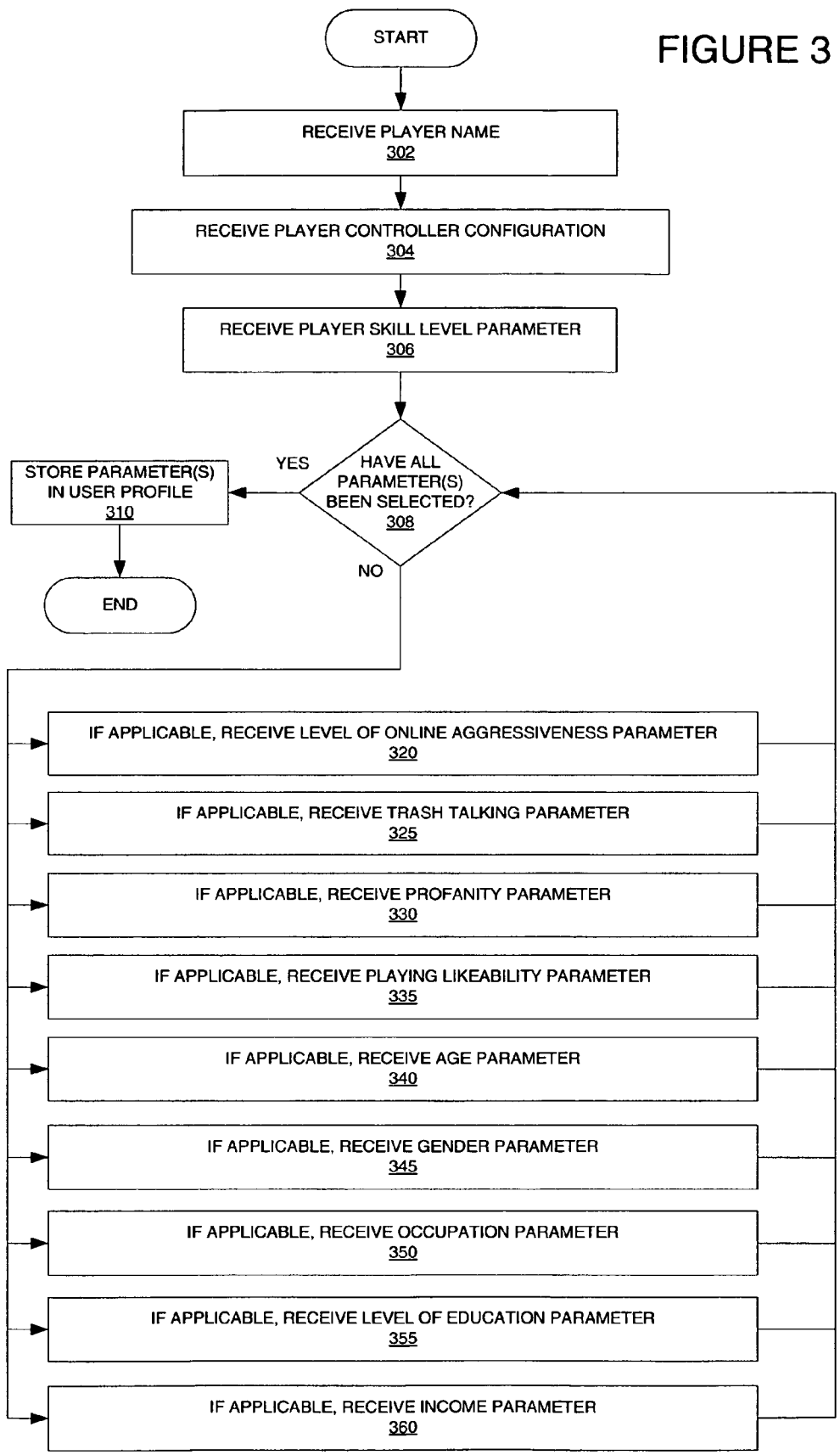
FIG. 3 is a flow chart of an illustrative method for creation and/or modification of profile of a user for matching in an online gaming environment in accordance with at least one aspect of the present invention.

FIG. 3 is a flow chart of an illustrative method for creation and/or modification of a profile of a user/player for matching with other users/players in an online gaming environment in accordance with at least one aspect of the present invention. The process starts at step 302 where a matchmaking system receives the name of the user/player and proceeds to step 304 where the system receives a preferred controller configuration for gaming purposes. An example of a preferred controller configuration for gaming purposes includes a predefined setting on the controller for the buttons and operations of inputs, such as in flight simulation games, pushing up on a joystick will lower the nose of the plane compared to a different configuration where pushing up on the joystick will lift the nose of the plane. An example matchmaking service may request and/or receive the general skill level parameter of the user, whether for a particular game and/or for anything. At step 308, a determination is made as to whether all parameter (s) have been selected by the user and/or all parameter(s) required by the system have been selected. Although the matchmaking system may be configured to allow for a user to be matched based upon a play style parameter, a user may want to immediately to be connected to a game with no more than the general skill level as the filtering parameter. If all parameter(s) have been selected at step 308, the process proceeds to step 310 where the parameter(s) are stored in a profile of the user.

In the alternative, if all parameter(s) have not been selected at step 308, the process proceeds to steps 320-360. For each of steps 320-360, if applicable, the system receives the corresponding play style or personal attribute parameter and the process returns to step 308. For example, responsive to the user and/or system selecting a level of online aggressiveness, at step 320, the system receives the level of online aggressiveness parameter, and returns to step 308. Level of online aggressiveness may be an indicator of the amount of risk that a player will take during a game. The level of online aggressiveness parameter may be the level that the user would like to play with/against or it may be the level of the user herself, e.g., whether the user herself is very aggressive. Responsive to the user and/or system selecting a level and/or allowance of trash talking, at step 325, the system receives the trash talking parameter and returns to step 308. The level and/or allowance of trash talking parameter may be the level and/or allowance that the user would like to play with/against or it may be the level and/or allowance of the user herself, e.g., whether the user herself trash talks. Responsive to the user and/or system selecting a level and/or allowance of profanity, at step 330, the system receives the profanity parameter and returns to step 308. The level and/or allowance of profanity parameter may be the level and/or allowance that the user would like to play with/against or it may be the level and/or allowance of the user herself, e.g., whether the user herself uses profanity. Responsive to the user and/or system selecting a playing likeability factor for another player and/or the playing likeability factor of the user herself, at step 335, the system receives the playing likeability parameter and returns to step 308. Other play style parameters not shown may include a competitiveness parameter, e.g., whether the player plays to win or plays for fun, a role play parameter, e.g., how much the player assumes the role of the character during the game, and a honesty/trustworthy parameter, e.g., whether a player tends to deceive others during the game.

Responsive to the user and/or system selecting a desired age of another player and/or the age of the user herself, at step 340, the system receives the age parameter and returns to step 308. Responsive to the user and/or system selecting a desired gender of another player and/or the gender of the user herself, at step 345, the system receives the gender parameter and returns to step 308. Responsive to the user and/or system selecting a desired occupation of another player and/or the occupation of the user herself, at step 350, the system receives the occupation parameter and returns to step 308. Responsive to the user and/or system selecting a level and/or minimum/maximum amount of education for another player and/or for the user herself, at step 355, the system receives the education parameter and returns to step 308. Responsive to the user and/or system selecting a level and/or allowance of income of another player and/or the income of the user herself, at step 360, the system receives the income parameter and returns to step 308. Other personal attribute parameters not shown may include a home state parameter, a physical appearance characteristic parameter (such as eye color, hair color, body shape), and a leisure activity parameter, e.g., whether a player participates in a certain type of leisure activity.

Play style parameters may be associated with a particular game as well. In one example, a user may have a more aggressive play style parameter for a first game, but then also have a less aggressive play style parameter for a second game. A play style parameter for a particular game may include whether the user prefers to play the game to win or play the game for fun, e.g., a competitiveness parameter. A play style parameter may be associated with a characteristic of the user for a particular game only, such as being a team player for one game while being a saboteur or trash talking for another. Examples of play style parameters include, but are not limited to whether the user: is honesty/trustworthy, is a team player, is a committed gamer, plays to win vs. plays for fun, enacts the role in the game (takes on the purpose of the character, e.g., performs the purpose of a sniper in a team combat game), meets a desired playing likeable, is aggressive, and is a trash talker. Play style parameters can be determined based upon data received from other players and/or the user, such as the playing likeability, trash talking, and honesty/trustworthy parameters. It should be understood by those skilled in the art that play style parameters may be determined by the user herself and/or by the matchmaking system, such as by use of a collaborative filtering method described below.

A personal attribute parameter may be associated with a characteristic of the user that is not game specific, such as the age, income, educational background, occupation, family status (such as mother, grandmother, oldest sibling, divorcee) of the player. A personal attribute parameter may also be a voice recording of the user. Examples of personal attribute parameters include, but are not limited to whether the user: meets an educational background requirement, meets an income requirement, meets a physical appearance requirement, meets a friendliness requirement, is humorous, meets an age requirement, meets a gender requirement, meets a home state requirement, meets an occupation requirement, and meets a leisure activity requirement. Personal attribute parameters can be determined based upon data received from other players and/or the user.

Figure 4:
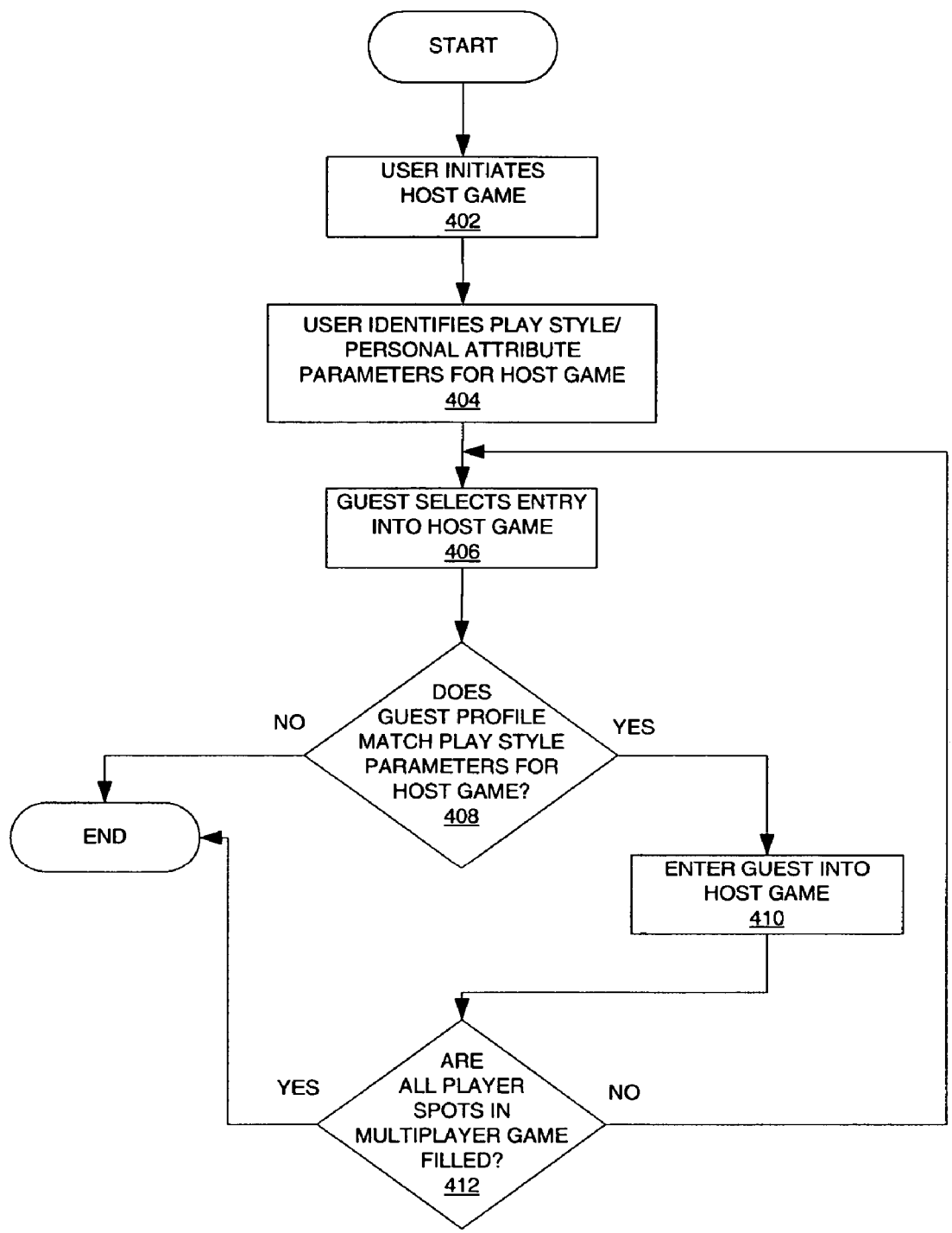
FIG. 4 is a flow chart of an illustrative method for matching guests to a host game in an online gaming environment in accordance with at least one aspect of the present invention.

FIG. 4 is a flow chart of an illustrative method for matching guests to a host game in an online gaming environment in accordance with at least one aspect of the present invention. At step 402, a user initiates a host game. There are many ways in which a user may initiate a host game in an online gaming environment and the present invention is not restricted to any one method. At step 404, the user identifies and/or selects play style and/or personal attribute parameters for the host game. In this step, the user may choose that only people willing to hear trash talk are allowed to participate and/or only people that live in the New England area, that are female, and that are college educated are allowed to participate. Although not shown in this example, the user could also choose other parameters, such as technical capabilities of another player and/or general skill level of another player. In this example, if a user chooses to participate in a checkers game type, the user may have to allow for trash talking and/or be a college educated female that resides in the New England area.

At step 406, a guest selects entry into the host game of the user. At step 408, a determination is made as to whether the guest profile matches the play style and/or personal attribute parameters required to participate in the host game. For example, a guest profile might be required to show that the guest is from the New England area, that she is female, and that she is college educated. If the guest profile does not match the play style and/or personal attribute parameters required to participate in the host game, the guest cannot be matched to participate in the host game and the process concludes. Alternatively, if the guest profile does match in step 408, the process proceeds to step 410 where the guest is entered into the host game. The process proceeds to step 412 where a determination is made as to whether all player spots have been filled for the multiplayer host game. If yes, the process is concluded. If no, the process returns to step 406 to await more guests to participate. Although not shown in this example, the host game of the matchmaking system also may require that the guest profile match a general skill level parameter and/or a technical capability parameter.

Figure 5:
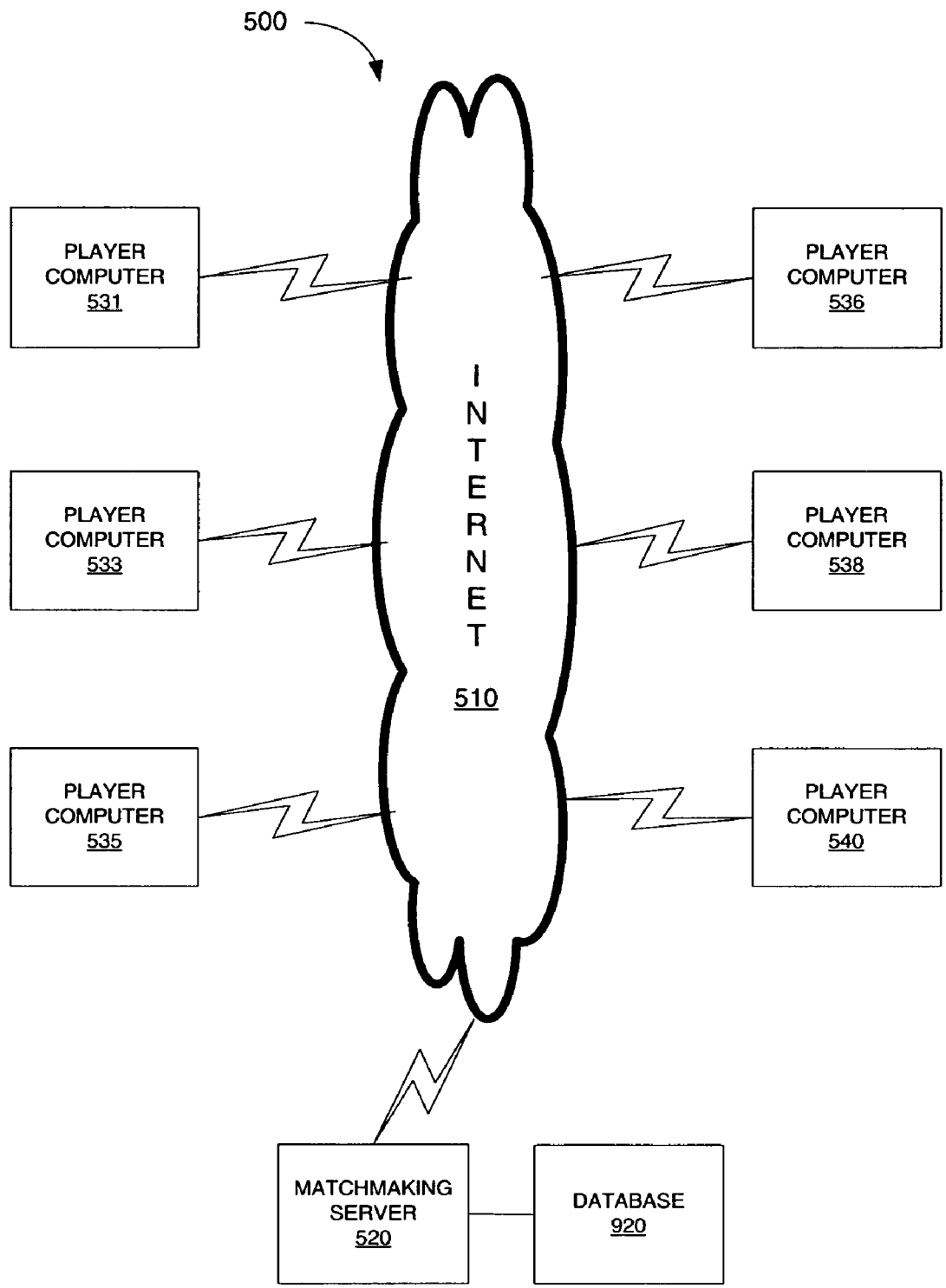
FIG. 5 is an exemplary schematic block diagram of a network layout utilizing matchmaking in accordance with at least one aspect of the present invention.

FIG. 5 is an exemplary schematic block diagram of a network layout 500 utilizing matchmaking in accordance with at least one aspect of the present invention. As shown in FIG. 5, online game matchmaking environment 500 includes a communication medium, such as the Internet 510, a matchmaking server 520, and player computers 531-540. Under the system 500, a user can connect via player computer 531 to the matchmaking server 520 via the Internet 510. The Internet 510 is but one method for online gaming capabilities over a network. Other similar modes for data transmission can be utilized in its place. Once connected to the matchmaking server 520, the user can request to be matched to a particular game in accordance with a profile of the user and/or answering questions to filter the process. Examples of such are described above with reference to FIG. 2A to FIG. 4.

A user at player computer 538, also connected through the Internet 510, may have a host game awaiting other players to join. Matchmaking server 520 can compare the profile of the user at player computer 531 to see if it meets the requirements for the host game of the user at player computer 538. If so, matchmaking server 520 can match the user at player computer 531 to the host game of the user at player computer 538.

FIGS. 6A and 6B are example graphical user interfaces for matching users/players in an online gaming environment in accordance with at least one aspect of the present invention. FIG. 6A shown an example screen 600 that may be displayed to a user having logged into the matchmaking service. As shown in FIG. 6A, a question or set of questions can be displayed for the user to respond answer. In this example, the system requests three answers. First, the system asks whether the user wishes to host a game or join a game type. In this example, the user has selected to join a game type by clicking the check box 615 beside that entry. Second, the system asks the user which available game type the user wishes to join. In this example, there are two available games, "BASEBALL 3000" and "FOOTBALL EXTREME". The user has selected "FOOTBALL EXTREME" as shown by checked box 625. Finally, the system asks a play style question, whether the user plays more aggressive or less aggressive. The user has selected less aggressive as shown by checked box 635. If desired, although not shown, a user could choose the other parameters? button 690 to allow the user to select other parameters for matchmaking purposes. The other parameters can be play style parameters, personal attribute parameters, general skill level parameters, and/or technical capability parameters.

FIG. 6B shows another graphical user interface after the user has answered all of the questions presented in FIG. 6A. As shown in FIG. 6B, example screen 605 displays the results. The matchmaking system has found four current open games that the user can join because the play style and/or personal attribute parameters within the user's profile match the requirements of the host game and/or because the play style and/or personal attribute parameters of all of the other participants in the open games or the open game play style and/or personal attribute parameters match the requirements/desires of the user. For example, each game shown on screen 605 may require a user that plays the game less aggressively as a play style parameter. Alternatively, every open game may be a less aggressive game as desired by the user. The user can select to filter the number of open game choices by choosing the other parameters? button 695 to filter by more parameters, whether play style parameters, personal attribute parameters, general skill level parameters, and/or technical capabilities parameters. As shown in FIG. 6B, the user has selected the game entitled, "MIKE'S BEARS VS. PACKERS FOREVER GAME" as shown by checked box 660. By checking box 660, the user has completed the matchmaking process to be connected to a particular game based upon a play style and/or personal attribute.

FIGS. 7A and 7B are example graphical user interfaces for matching players in an online gaming environment in accordance with at least one aspect of the present invention. FIGS. 7A and 7B may be screens 700 and 705 respectively displayed to a user if the user decides to further filter the matchmaking process by other parameters. Such a case may occur when the user presses the other parameters? button 690 or 695. As shown in FIG. 7A, the user is given a list of possible additional parameters that may be used to further filter the matchmaking process. As shown on screen 700, the user can check a box or boxes that correspond to the desired parameter. For example, multiple play style and personal attribute parameters are shown on screen 700 for basing a match with the user, including income, age, home state of the other player, whether trash talking is allowed/accepted by the user, and even a physical appearance characteristic of the other player. As shown in FIG. 7A, the user has checked the physical appearance characteristic box 715 indicating that she wishes to be matched to another user in for an online gaming experience based upon some characteristic of the physical appearance of the other player. For instance, a characteristic of the physical appearance of the other player may be a picture, a video segment, and/or textual information, such as hair color, eye color, and/or height.

As shown in FIG. 7B, screen 705 may be displayed when the user has checked the physical appearance characteristic box 715 shown on FIG. 7A. Screen 7B shows a picture of four available other players that the user can choose between to be matched up for an online gaming experience. Because players can interact direct by two way audio in some online gaming systems, and further because many individuals are playing online games for social rather than mere competitive reasons, a user may want to be playing with/against someone based upon a characteristic of his/her physical appearance. As shown in FIG. 7B, the user has selected the individual picture shown in the lower right corner by checking box 765. As such, the user may be matched with the individual associated with the picture shown to an online gaming experience. Still further, at any point in this process, the user can select the still other parameters? button 790 and/or 795 to see even more possible parameters to choose from for matchmaking purposes. A user may desire to be matched with a user for an online gaming experience based at least in part on a physical appearance characteristic of another player for certain game categories, game types, or games. For example, a player may wish to participate in an interactive social lifestyle game type such as the SIMS™ series of games developed by Electronic Arts™, Inc. of Redwood City, Calif. In such a game type, a user may be able to place an image of a physical appearance characteristic of a real life person onto a body of a character within the game to interact with. As such, the physical appearance characteristic of a person may be a desired parameter to choose from.

FIGS. 8A and 8B are example graphical user interfaces for accumulating data from players in an online gaming environment in accordance with at least one aspect of the present invention. Profile information for a user can be generated by the user herself and/or by accumulation of data based upon information received from and/or about the user. Collaborative filtering methods can be used to accumulate the data necessary for matchmaking purposes based upon play style personal attribute, technical capability, and/or general skill level parameters and for matching players to game categories, game types, and/or games. For example, playing likeability, competitive, and honesty/trustworthy play style parameters may be determined either partially or entirely through collaborative filtering methods. Similarly, personal attribute parameters can be used by a collaborative filtering method to match users. Collaborative filtering is the process of aiding a person in the selection of an item based upon the evaluations made by others and/or the person and others. Collaborative filtering methods help to reduce the information overload that the person may encounter in a matchmaking environment system. Collaborative filtering methods employ and/or produce ratings, e.g., an evaluation of an individual, a game, and/or an experience. Collaborative filtering may be based on computation of various types of information, such as responses received from a user after a game has been played. Based upon the information received by means of collaborative filtering methods, a player can be matched to a certain game and/or recommended game. Collaborative filtering methods for document retrieval, product purchases, and/or product recommendations are well known in their respective arts.

The graphical user interfaces shown in screen 800 and 805 of FIGS. 8A and 8B respectively illustrate example screens that may be displayed to the user upon completion and/or ending of an online game experience. FIGS. 8A and 8B illustrate an example multiplayer game in which four individuals participated. As part of the post game analysis shown in FIG. 8A, the system asks the user to answer a few questions. The responses to these questions may be used to assign play style parameters to a user and/or other people. In FIG. 8A, the system asks the user to answer whether she enjoyed the game itself, e.g., whether the selected game, "FOOTBALL EXTREME", was enjoyable. The user has responded by checking the no box 815. For a collaborative filtering method, the question may be how much the user enjoyed the game on a scale of 1-10. Next, the system asks the user whether she enjoyed playing with the people in the multiplayer game, Bob, Mike, and Jim. As shown, the user has checked the yes box 825. Then the system asks the user to state who her favorite person was to play with/compete against. The user has selected Bob by checking box 835. Finally, the system asks the user to select the person that she did not like to play with/compete against and/or the least favorite person that she played with/competed against. In this example, the user has selected Mike by checking box 845. If the user so desires, she may answer further questions and/or provide comments or other data by pressing the other questions? button 890.

FIG. 8B may be displayed to the user responsive to the answers she submitted in FIG. 8A. The first questions presented may be in response to how she answered the first question in FIG. 8A. Specifically, in this example, the system asks the user to indicate specific information about the game just played. In this example, the user has checked the boxes indicating that the game, "FOOTBALL EXTREME", was too violent 865 and too difficult 867 for the user. The system next asks the user to evaluate player Bob. Because the user indicated that Bob was her favorite player to play with in the game as shown in FIG. 8A, the system can configure the choices for the user to choose from based upon previous responses received. As such, in this example, the user has selected the checked box 785 indicating that she felt that Bob was friendly to participate with in the game, but that he was not very good at the game itself. Next, the system asks the user to evaluate player Mike. Because the user indicated that Mike was her least favorite player to play with in the game as shown in FIG. 8A, the system can configure the choices for the user to choose from based upon the previous responses received. As such, in this example, the user has selected the checked box 885 indicating that she felt that Mike was good at the game itself, but not very friendly to participate with in the game. Again, if the user so desires, she may answer further questions and/or provide comments or other data by pressing the other questions? button 895.

Based upon the responses received from the user and/or the other participants in the game, the matchmaking system can set certain play style and/or personal attribute parameters of an individual in the individual's profile. For example, if three of the four participants indicated that Mike was not friendly to participate with in the game, the personal attribute parameter associated with friendliness for Mike may be modified in response. Any of a number of other methods may be used to modify a profile of an individual. Such methods may be used in conjunction with a collaborative filtering method for future matchmaking. For example, if an individual, such as Mike, has been identified by a number of gamers as a person that should not be matched with those gamers, the play style parameter "playing likeability" may be changed for Mike's profile to indicate that Mike has a low playing likeability rating. Therefore, in future matchmaking processes, users that want an individual with a high playing likeability rating will not be matched with a player like Mike having a low playing likeability rating. Any parameter, whether technical capability, general skill level, personal attribute, or play style, may be modified in response to the data received.

Collaborative filtering allows the matchmaking system to match a user to a particular game and/or player based upon the response received from others and the user that are associated with the user. For example, if user I has indicated in the past that she like to participate in sports games with Mike, and user 2 has indicated in the past that she likes to participate in sports games with user 1, the matchmaking system, by collaborative filtering, can match user 2 into a sports game with Mike based upon the associated connection with user 1. This is but one example of a relatively simple collaborative filtering method. In actual practice, there may be thousands of users and associations with different degrees of relevance and/or factoring. Under another collaborative filtering method the determination to match a user may be based upon the desires of the user herself as well as other players. For example, if user 1 is a more aggressive player, her preferences based on a one way collaborative filtering process may be to play against a less aggressive player. In a one way filter determination, user 1 may seem to be an accurate match with player 2. However, player 2 may dislike participating against more aggressive players in a gaming environment and may be a comparatively low probability collaborative filtering match with user 1. A two way collaborative filtering method may include a two way analysis to consider the weighted likelihood of enjoyment for both user 1 and player 2. In response, the matchmaking system with a two way collaborative filtering method may not match user 1 with player 2. U.S. Pat. Nos. 6,353,813 and 6,092,049 describe collaborative filtering methods that may be used with the present application. U.S. Pat. Nos. 6,353,813 and 6,092,049 are herein incorporated by reference.

Figure 9:
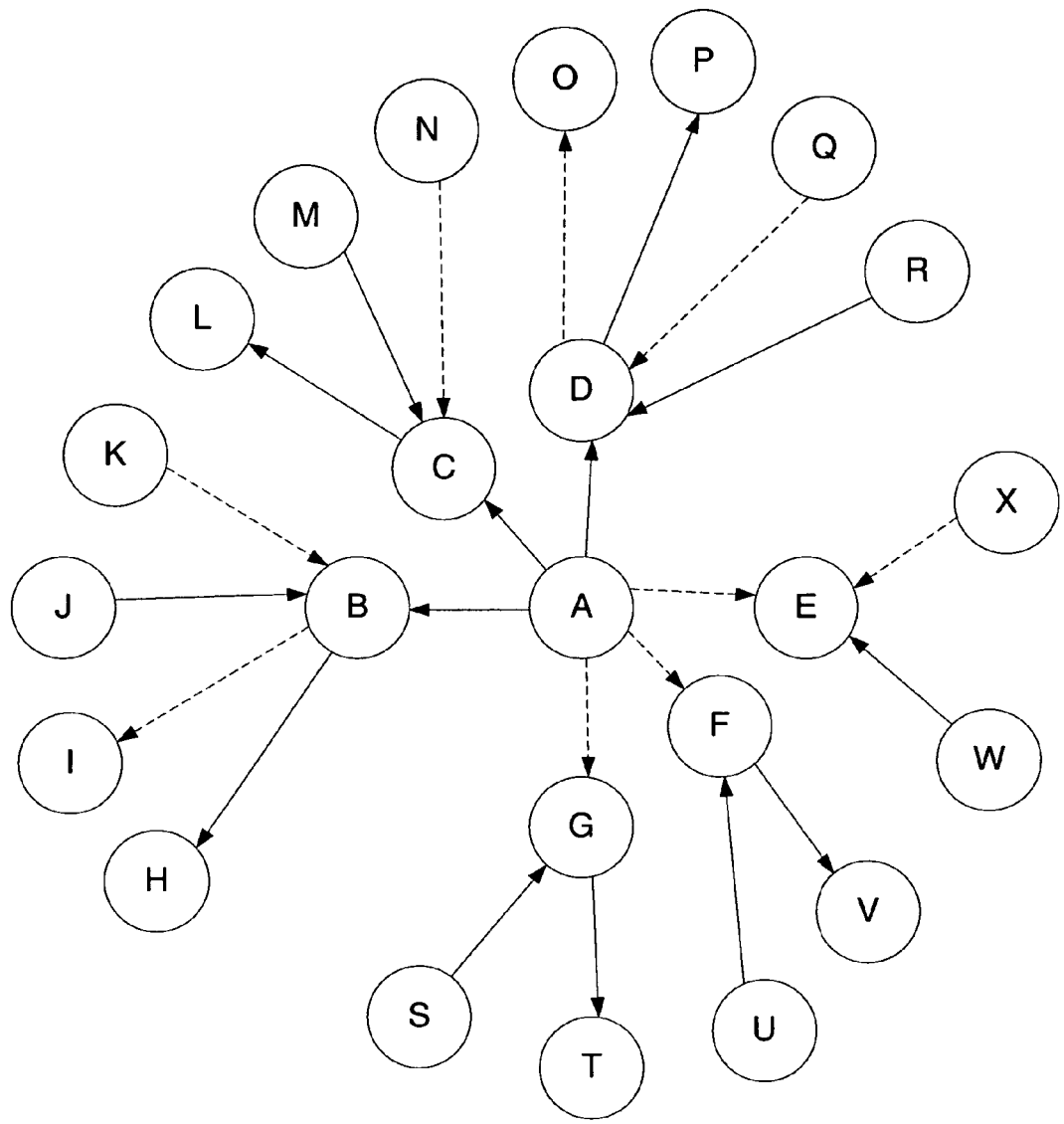
FIG. 9 is a diagram of an illustrative example of a relationship between a Player A and other Players in an online gaming matchmaking system in accordance with at least one aspect of the present invention.

In operation for one example, a collaborative filtering method may be used as follows with reference to FIG. 9. Within a single game type (CHECKERS EXTREME), if Player A enjoyed playing with Players B, C, and D, but did not enjoy playing with Players E, F, and G, in a future matchmaking occurrence, the system may decide to match Player A with players that Players B, C, and/or D enjoyed playing (such as Players H, L, and P) and with players that enjoyed playing with Players B, C, and/or D (such as Players J, M, and R). The matchmaking system may decide to not match Player A with players that B, C, and/or D did not enjoy playing (such as Players I and O) and with players that did not enjoy playing with Players B, C, and/or D (such as Players K, N, and Q). Further, the matchmaking system may decide to not match Player A with players that enjoyed playing with Players E, F, and/or G (such as Players S, U, and W) and with players that Players E, F, and/or G enjoyed playing (such as Players T and V). However, the matchmaking system may decide to match Player A with players that did not enjoy playing with Players E, F, and/or G (such as Player X). In each of the above described matching decisions, the matchmaking system can determine a likelihood of whether one player is a good match for another player (such the likelihood that Player A is a good match for Player H, but is not likely to be a good match for Player S). The determining of likelihood data can be maintained within a database included within and/or separate to the matchmaking system. The data associated with the likelihood of being a good match may be based on a scale, such as 1-10 and/or some other of a number of different ranking systems. The matchmaking system may also take into account a player's behavior across games. Thus, if Player A enjoyed playing team oriented games with Players B, C, and D, enjoyed playing sports games with Players B and C, but did not enjoy playing a team game on the same team with Players B and D, in a matchmaking process, Player A may be matched with Players B, C, and D in a team oriented sports game in which Player A is on the same team as Player C, while Players B and D are on the opposite team.

As described above, FIG. 5 is an exemplary schematic block diagram of a network layout 500 utilizing matchmaking in accordance with at least one aspect of the present invention. Network layout 500 may include a database 920 coupled to the matchmaking server 520. Under the system 500, a user can connect via player computer 531 to the matchmaking server 520 via the Internet 510. Once connected to the matchmaking server 520, the user can request to be matched to a particular game in accordance with a profile of the user and/or answering questions to filter the process. The profile of the user may be stored at database 920 and/or another location.

A user at player computer 538, also connected through the Internet 510, may have a host game awaiting other players to join. Matchmaking server 520 can compare the profile of the user at player computer 531 to see if it meets the requirements for the host game of the user at player computer 538. A profile of a player can be stored locally at the player computer, at database 920 of the matchmaking server 520, and/or at another external database. If the profile matches the requirements, matchmaking server 520 can match the user at player computer 531 to the host game of the user at player computer 538. Upon completion of the game, the user at player computer 531 can provide data that can be stored in database 920 and/or processed by the matchmaking server 520 and then stored in database 920. It should be understood by one skilled in the art that the data may be processed in a computer external to the matchmaking server 520 and/or the database 920. The data may allow the matchmaking server 520 to more accurately match users into games fitting their desired requirements.

In operation, a user may want to participate in a four player sports game in which trash talking and profanity are allowed. Further, the user may want to participate against someone of the same sex, age, occupation, and skill level (such as novice) for the game. The user can log onto the matchmaking service provider for online gaming. The user may enter her identification and password for authentication. The user may then choose to see available game categories. Since she wants to try a sports game, she chooses a sports game category. The system then may provide a listing of game types under the sports game category. The user then chooses a particular game category, such as "FOOTBALL EXTREME". In response, the matchmaking system may provide a listing of parameters with which the user may choose to filter the matchmaking process. Alternatively, the matchmaking system may access the profile of the user to determine the parameters for matching. The user chooses a four player game in which trash talking and profanity are allowed as well as limiting to game with players who are female, of the same age and occupation as the user, and whose skill level is novice. In response, the system provides a list of available open games that meet the criteria of the user. Alternatively, the system may automatically match the user based at least in part on the selected parameters. Once the user chooses a particular game from the list, the system connects the user to the game. Once complete, the matchmaking system can use responses received from the user for evaluation of the game and/or other participants to be used for future matchmaking processes for the user and/or others.

While illustrative systems and methods as described herein embodying various aspects of the present invention are shown, it will be understood by those skilled in the art, that the invention is not limited to these embodiments. Aspects of the present invention may be included into existing matchmaking systems and/or methods. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for matching users over a network in an online gaming environment, the method comprising steps of:

entering a user into a first online game available over the network;

receiving from the user by way of the network at least one response to at least one query to the user about the first online game experience following completion of the first online game by the user;

determining a play style parameter of a requesting user based on the at least one response, the determined play style parameter for being employed to connect the requesting user to a second online game available over the network, the second game being different from the first online game; and connecting the requesting user to the second online game based at least in part on the determined play style parameter;

the connecting being based at least in part on a collaborative filtering method that aids the requesting user in the selection of the second online game based upon evaluations of the second online game made by other users.

2. The method of claim 1, wherein the determining step comprises the steps of:
receiving a profile of the requesting user; and
identifying the play style parameter of the requesting user in the profile.

3. The method of claim 1, wherein the connecting step includes the step of determining whether the determined play style parameter matches a play style parameter requirement for the second online game.

4. The method of claim 1, further comprising the steps of:
providing a list of online games with a play style parameter requirement that matches the determined play style parameter of the requesting user; and
receiving a selection signal representative of the second online game from the list of online games.

5. The method of claim 1, wherein the determining step comprises the steps of:
providing a list of play style parameters; and
receiving a selection signal representative of the play style parameter from the list of play style parameters.

6. The method of claim 1, further comprising the steps of:
receiving a request to initiate a matchmaking service for the requesting user;
receiving identification data of the requesting user; and
retrieving a profile of the requesting user.

7. The method of claim 1, wherein the play style parameter comprises one of: a competitive parameter, a profanity parameter, a trash talking parameter, and an aggressiveness parameter.

8. The method of claim 1, further comprising the steps of:
determining whether a profile exists for the requesting user; and
loading the existing profile of the requesting user.

9. The method of claim 1, further comprising the steps of:
determining whether to create a new profile of the requesting user; and
creating the new profile of the requesting user.

10. The method of claim 9, wherein the step of creating the new profile comprises the steps of:
receiving at least one parameter for the requesting user; and
storing the at least one parameter in the new profile.

11. The method of claim 10, wherein the at least one parameter includes the play style parameter of the requesting user.

12. The method of claim 1, further comprising the steps of:
determining whether a profile of the requesting user is to be modified; and
modifying the profile of the requesting user.

13. The method of claim 12, wherein the step of determining whether the profile of the requesting user is to be modified includes a step of receiving data from a collaborative filtering process.

14. The method of claim 1, wherein the at least one query includes a question as to whether the user enjoyed playing the first online game.

15. The method of claim 1, wherein the user is the requesting user.

16. The method of claim 1, wherein the first online game is a multi-player game including the user and at least one other player and wherein the at least one query includes a question as to whether the user enjoyed playing the at least one other player in the first online game.

17. The method of claim 16, wherein the at least one query includes a question as to whether the user enjoyed playing the first online game.

18. The method of claim 1, further comprising the steps of:
receiving a request to host the second online game;
receiving at least one parameter requirement for the second online game, the at least one parameter requirement includes a play style parameter requirement; and
determining whether the play style parameter of the requesting user matches the at least one parameter requirement for the second online game.

19. A computer-readable medium having computer-executable instructions for matching users over a network in an online gaming environment, the method comprising steps of:
entering a user into a first online game available over the network;
receiving from the user by way of the network at least one response to at least one query to the user about the first online game experience following completion of the first online game;
determining a play style parameter of a requesting user based on the at least one response, the determined play style parameter for being employed to connect the requesting user to a second online game available over the network, the second game being different from the first online game; and
connecting the requesting user to the second online game based at least in part on the determined play style parameter and on a collaborative filtering method that aids the requesting user in the selection of the second online game based upon evaluations of the second online game made by other users.

20. The computer-readable medium of claim 19, the method further comprising steps of:
receiving a request to host the second online game;
receiving at least one parameter requirement for the second online game, the at least one parameter requirement includes a play style parameter requirement; and
determining whether the play style parameter of the requesting user matches the at least one parameter requirement for the second online game.

21. A matchmaking system for matching users over a network in an online gaming environment, the matchmaking system comprising:
a matchmaking server configured to connect a user to a first online game available over the network, to receive from the user by way of the network at least one response to at least one query to the user about the first online game experience following completion of the first online game, to determine a play style parameter of a requesting user based on the at least one response, the determined play style parameter for being employed to connect the requesting user to a second online game available over the network, the second game being different from the first online game, and to connect the requesting user to the second online game based at least in part upon the determined play style parameter of the requesting user and on a collaborative filtering method that aids the requesting user in the selection of the second online game based upon evaluations of the second online game made by other users; and a database configured to store a profile of the requesting user, the profile including the play style parameter of the requesting user.

22. The matchmaking system of claim 21, further comprising a computer configured to process data based upon a collaborative filtering process.

23. The matchmaking system of claim 22, wherein the matchmaking server includes the computer.

24. The matchmaking system of claim 22, wherein the computer is further configured to modify the profile of the requesting user responsive to the processed data.

25. The matchmaking system of claim 21, wherein the play style parameter of the requesting user comprises one of: aggressiveness, playing likeability, enacting the role, and trash talking.

26. The matchmaking system of claim 21, wherein the play style parameter comprises one of: technical capability and general skill level.

27. The matchmaking system of claim 21, wherein the play style parameter of the requesting user is associated with a particular online game.

28. A method for matching a first player with a second player over a network in an online gaming environment, the method comprising steps of:
  entering a user into a first online game available over the network;
  receiving from the user by way of the network at least one response to at least one query to the user about the first online game experience following completion of the first online game;
  storing the at least one response in a database;
  receiving a request to initiate a matchmaking service for the first player;
  receiving identification data of the first player;
  retrieving a profile of the first player;
  determining a play style parameter of the first player based on the at least one response, the determined play style parameter for being employed to connect the requesting user to a second online game available over the network, the second game being different from the first online game;
  applying a collaborative filtering method that aids the requesting user in the selection of the second online game based upon evaluations of the second online game made by other users; and
  connecting the first player and the second player to the second online game based at least in part on the determined play style parameter.

29. The method of claim 28, wherein the step of determining includes the step of determining a likelihood of whether the second player is a good match for the first player.

30. The method of claim 29, wherein the step of determining further includes the step of determining a likelihood of whether the first player is a good match for the second player.

31. The method of claim 28, wherein the step of determining is based at least in part upon a play style parameter of the second player.

32. The method of claim 28, wherein the step of determining is based at least in part upon data representative of a previous response of the second player.

33. The method of claim 28, wherein the step of determining is based at least in part upon the data representative of a previous response of a third player.

34. The method of claim 33, wherein the previous response is an evaluation of the second player.

35. The method of claim 33, wherein the previous response is an evaluation of the second online game.

36. The method of claim 28, wherein the step of determining is based upon an evaluation of the first player made by others following a previous online game.

* * * * *

UNITED STATES PATENT AND TRADEMARK OFFICE
CERTIFICATE OF CORRECTION

| | | |
|---|---|---|
| PATENT NO. | : 7,614,955 B2 | Page 1 of 1 |
| APPLICATION NO. | : 10/788408 | |
| DATED | : November 10, 2009 | |
| INVENTOR(S) | : Shelly D. Farnham et al. | |

It is certified that error appears in the above-identified patent and that said Letters Patent is hereby corrected as shown below:

In Title page, in field (75), under "Inventors" column 1, line 3, delete "Scott Lee Tiernan" and insert -- Scott Counts --, therefor.

Signed and Sealed this
Twenty-second Day of February, 2011

David J. Kappos
*Director of the United States Patent and Trademark Office*